United States Patent [19]

Whitney et al.

[11] 4,071,857
[45] Jan. 31, 1978

[54] CASSETTE CHANGER APPARATUS

[75] Inventors: James C. Whitney, Weston; Willy M. Sander, Stamford; Andre T. Debaudringhien, Bridgeport, all of Conn.

[73] Assignee: Dictaphone Corporation, Rye, N.Y.

[21] Appl. No.: 722,144

[22] Filed: Sept. 10, 1976

[51] Int. Cl.² .................. G11B 15/68; G11B 15/24; G11B 23/08
[52] U.S. Cl. .................................. 360/92; 360/96; 360/105
[58] Field of Search ............... 360/92, 91, 96, 132, 360/134, 69, 105–106, 71–74; 242/197–200, 180–181; 352/6–8; 214/16.4

[56] References Cited

U.S. PATENT DOCUMENTS

| | | | |
|---|---|---|---|
| 3,765,684 | 10/1973 | Sato | 360/92 |
| 3,825,949 | 7/1974 | Pyles | 360/92 |
| 3,852,818 | 12/1974 | Pyles | 360/91 |
| 3,886,591 | 5/1975 | Bettini | 360/92 |
| 3,996,616 | 12/1976 | Surrock et al. | 360/92 |

Primary Examiner—Alfred H. Eddleman
Attorney, Agent, or Firm—Arthur V. Smith

[57] ABSTRACT

A cassette changer apparatus for use in a multiple cassette record and/or playback system. An input magazine stores a stack of cassettes, preferably in a vertical stack, each cassette housing magnetic tape therein. An output magazine is spaced from the input magazine and stores a stack of cassettes; and a record/playback station is disposed intermediate the input and output magazines. A fresh cassette is conveyed by an endless conveyor from the input magazine to the record/playback station, and thence to the output magazine whereat an elevator loads the cassette into the stack in the output magazine. A record/playback deck is pivotally driven at the record/playback station from a first position that is spaced from a cassette conveyed to the station to a second position that is in operative relation with respect to such a cassette so that a record and/or playback operation can be performed. Thereafter, the deck is pivoted back to its first position to permit the cassette to be unloaded and conveyed to the output magazine.

20 Claims, 5 Drawing Figures

CASSETTE CHANGER APPARATUS

BACKGROUND OF THE INVENTION

This invention relates to a multiple cassette record and/or playback apparatus and, more particularly, to an automatic cassette changer to be used with such apparatus.

Magnetic tape cassettes wherein a magnetic tape is stored in a self-contained cartridge are widely used in various record and/or playback devices, such as in home entertainment systems, data logging systems, dictation systems and the like. Such tape cassettes offer the advantages of greatly simplifying the loading and unloading of tape by an operator, of protecting the tape during recording and playback operations and during handling of the tape, and of minimizing the bulk of the recording and playback devices used therewith. However, since the amount of tape that can be stored easily in a typical cartridge is rather constrained, there are finite limits on the amount of information that can be recorded thereon. In an attempt to increase such limitations of recorded information, some cassette manufacturers have attempted to increase the length of tape stored in a cassette. Nevertheless, in many applications, it is desirable to record and/or play back information substantially continuously for a length of time that exceeds the capacity of these cassettes as well.

Accordingly, there have been proposals for automatic cassette-changing devices whereby a multiple of tape cassettes can be automatically loaded individually and successively onto a record/playback deck to permit an operator to record or reproduce substantial lengths of information. In one proposed automatic cassette changing device, described in U.S. Pat. No. 3,821,806, a plurality of cassettes is stored in drum-like configuration and retrieved individually to be loaded onto a record/playback deck and then returned to the storage drum. This proposed device requires a relatively complex mechanical structure for the retrieval, loading, unloading and return of cassettes.

In another proposed automatic cassette changer, such as described in U.S. Pat. No. 3,752,485, plural cassettes are stored in a magazine of a type that is commonly found in photographic slide projector apparatus. As the magazine is indexed, individual cassettes are sequentially "pushed" from their storage compartments by a pushing arm and loaded onto a record/playback deck. After information is recorded on or reproduced from the loaded cassette, it is returned to its storage compartment in the magazine by the pushing arm and the magazine then is indexed to enable the next cassette to be retrieved.

A similar magazine-type cassette-changer is described in U.S. Pat. No. 3,860,964. These types of cassette-changing devices require a relatively complex mechanical construction and, moreover, are subject to various malfunctions, such as cassette jams, during loading and unloading operations. Moreover, if used to record information thereon, it may be difficult to withdraw recorded cassettes from the magazine until the full complement of cassettes has been used.

In a further proposed automatic cassette-changer, such as described in U.S. Pat. No. 3,756,608 or in U.S. Pat. No. 3,758,122, plural cassettes are stored in a magazine in stacked configuration, and individual cassettes are loaded onto a record/playback deck and thence into an output magazine, also in stacked configuration. As described in U.S. Pat. No. 3,756,608, the record/playback deck is disposed beneath the input stack and a movable platform lowers a cassette from the input stack onto the deck. After a recording or playback operation, the platform is raised and a "pusher" pushes the cassette from the platform into the output magazine. In U.S. Pat. No. 3,758,122, the deck is positioned intermediate the input and output magazines and a feed plate pushes the lowermost cassette from the input magazine onto the deck and thence into the output magazine. The use of mechanical "pushers" or feed plates is undesirable because of a susceptibility to jam the cassettes during a loading and/or unloading operation. Furthermore, since the next succeeding cassette cannot be loaded onto the deck until the immediately preceding cassette is fully unloaded by the mechanical "pusher" or feed plate, these automatic cassette-changers are relatively inefficient. That is, since these changers are not capable of loading a cassette simultaneously with unloading a cassette, a significant amount of time is required for a complete unloading/loading cycle.

OBJECTS OF THE INVENTION

Therefore, it is an object of the present invention to provide improved cassette changing apparatus wherein the problems encountered by prior art devices are avoided.

Another object of this invention is to provide improved cassette changing apparatus for a multiple cassette record and/or playback system wherein a supply of tape cassettes is arranged in stacked configuration, and endless conveyor member conveys individual cassettes from the supply to a record/playback deck and thence to an output store whereat cassettes are stored in stacked configuration, the record/playback deck pivots between unloaded and operating positions, and the output store has an elevator for loading each cassette conveyed thereto into an output stack.

Various other objects, advantages and features of the present invention will become readily apparent from the ensuing detailed description, and the novel features will be particularly pointed out in the appended claims.

SUMMARY OF THE INVENTION

In accordance with the present invention, cassette changer apparatus is provided for use with a multiple cassette record and/or playback system, the changer apparatus including an input magazine for storing a stack of cassettes, each cassette housing magnetic tape therein; an output magazine spaced from the input magazine for storing a stack of cassettes; a record/playback station intermediate the input and output magazines; an endless conveyor for conveying a cassette from the input magazine to the record/playback station, and thence to the output magazine; an elevator at the output magazine for receiving a conveyed cassette and for loading same into the stack in the output magazine; and a record/playback deck at the record/playback station that is pivotally driven between a first position that is spaced from a cassette conveyed to the record/playback station and a second position that is in operative relation with respect to such a cassette, the record/playback deck including tape drive elements and a magnetic transducer for recording information and/or reproducing information from the tape in a cassette at the record/playback station.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

The automatic cassette changer apparatus described below can be used in, for example, a central dictation system using magnetic tape cassettes as the recording medium, a home entertainment system wherein prerecorded magnetic tape cassettes are played back in sequence, a data logging system wherein data is recorded on individual magnetic tape cassettes, and the like. For the purpose of explaining the present invention, it will be assumed that the automatic cassette changer is used in the environment of a central dictation system. However, it should be clearly understood that this environment merely is illustrative and is not intended to limit the scope or use of the present invention.

Figure 1:
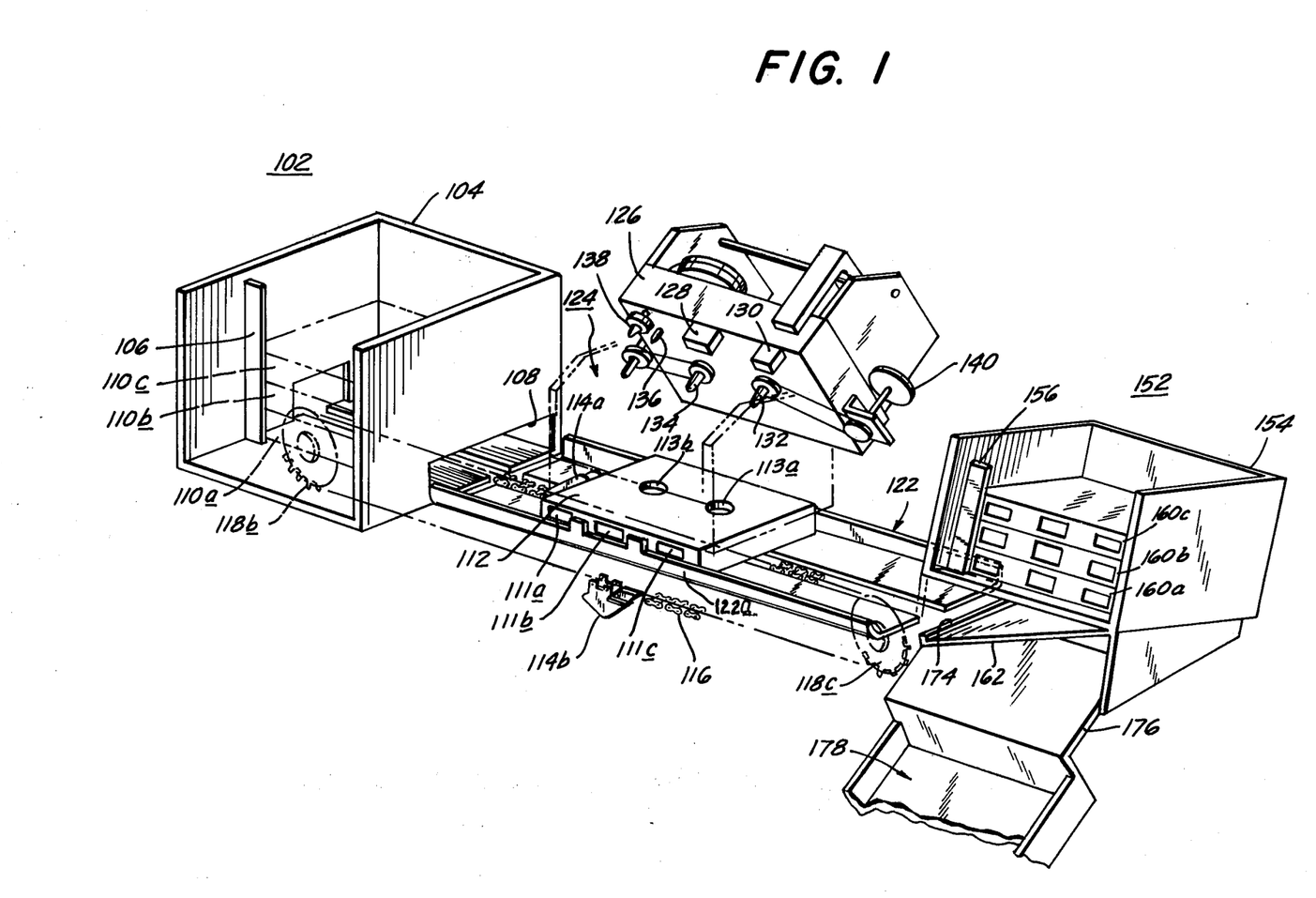
FIG. 1 is a perspective view of a preferred embodiment of a cassette changer that can be used with multiple cassette record and/or playback apparatus.
Figure 2:
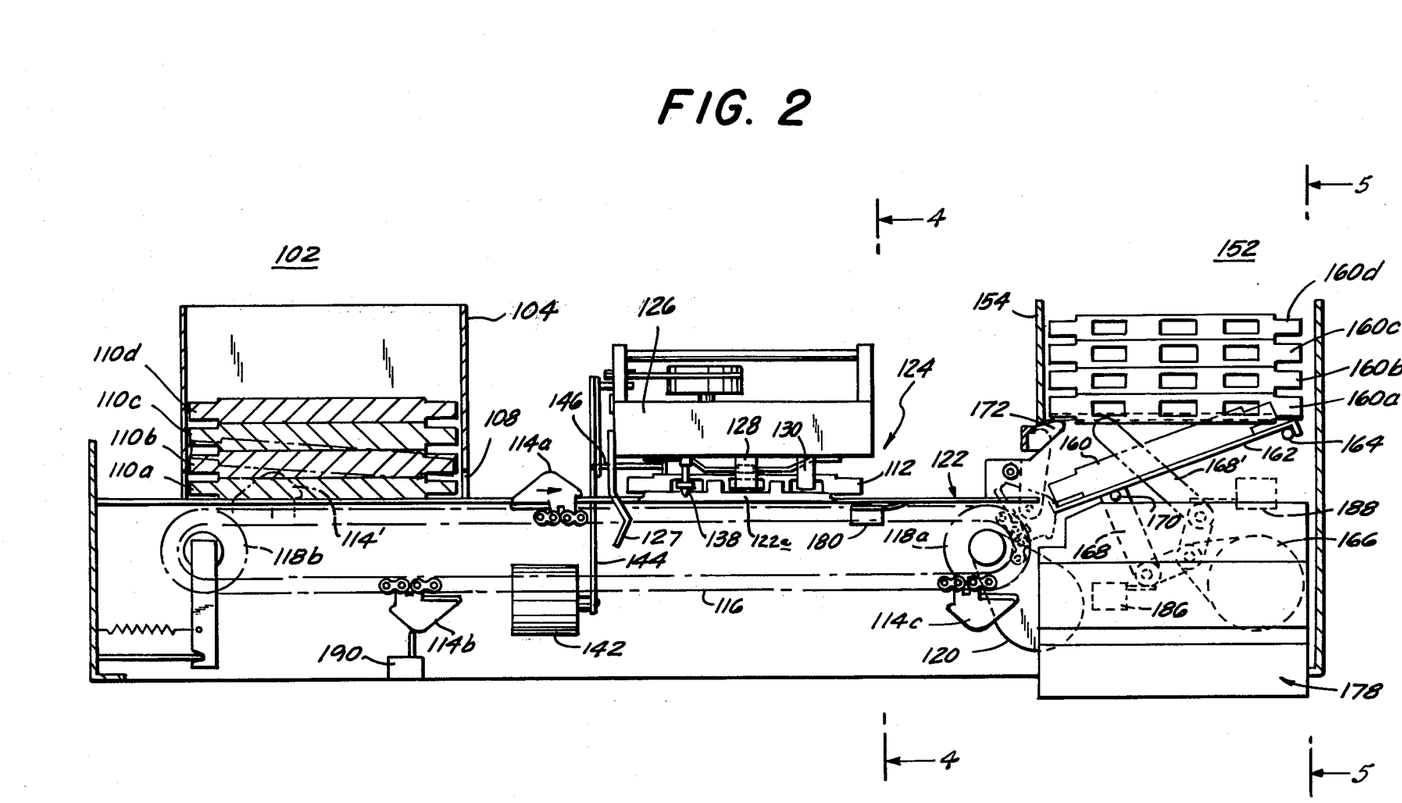
FIG. 2 is a front plan view of the apparatus shown in FIG. 1.
Figure 3:
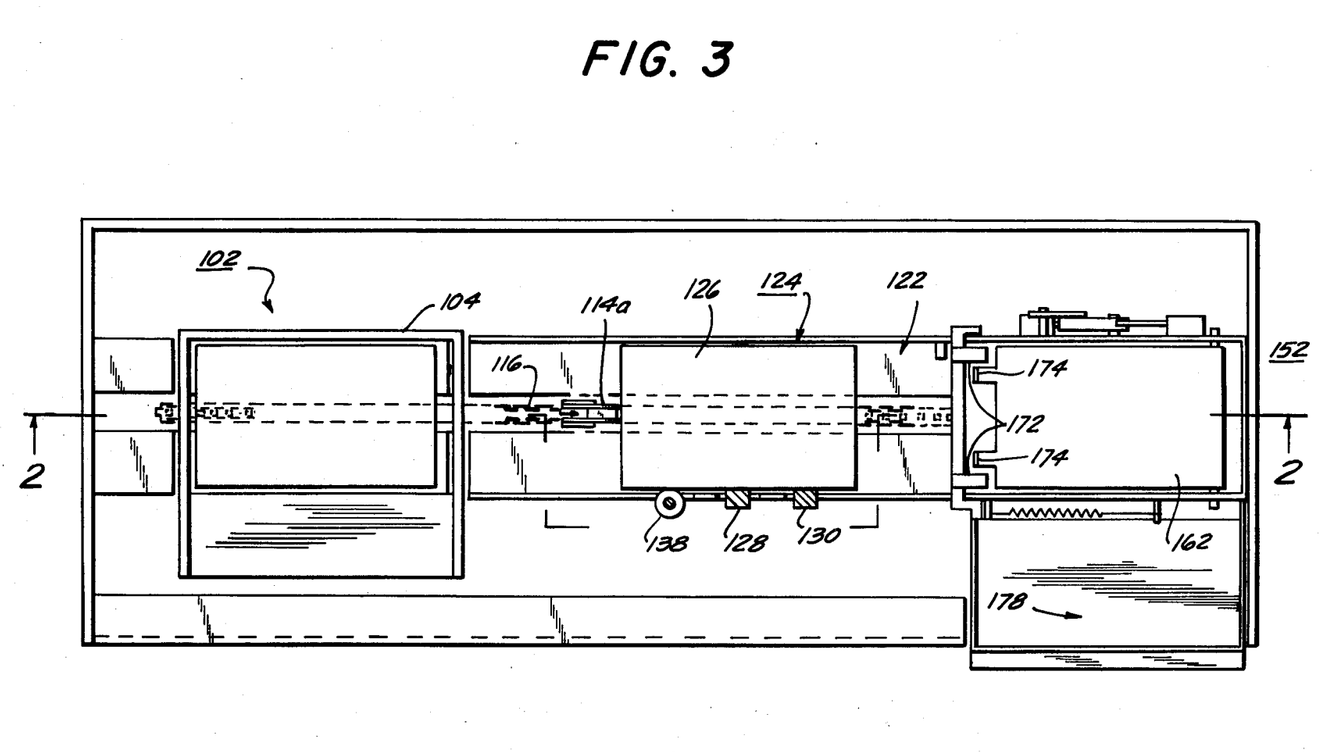
FIG. 3 is a top plan view of the apparatus shown in FIG. 1.

A preferred embodiment of the automatic cassette changer is shown in FIGS. 1–3. The central dictation system with which the cassette changer can be used may be of the type having electrical connections (not shown) to individual ones of a multiple of remote dictate stations, each such remote station having suitable controls to enable an operator to initiate a dictate operation and to review his previously dictated information, or messages. The cassette changer apparatus is comprised of an input stack 102 adapted to store, in stacked configuration, a multiple of magnetic tape cassettes, such as cassettes 110a, 110b, . . . , a record/playback station 124 having a record/playback deck 126 adapted to record information on and play back information from a magnetic tape cassette, and an output store 152 to which processed cassettes, i.e., cassettes which have had information recorded on or prerecorded information played back from the tape stored therein, are conveyed.

Input stack 102 comprises a magazine 104 formed of a plurality of walls, for example, three walls to support the stack of cassettes 110a, . . . therein. Magazine 104 also may be provided with one or more guide rails 106 for the proper positioning and alignment of the stacked cassettes. An exit 108 is formed in one of the walls of magazine 104 to permit the bottom-most cassette 110a to be conveyed out of the magazine from stack 102 toward record/playback station 124 by suitable conveying devices such as flights 114a, 114b, . . . , secured to a conveyor belt 116. To permit each flight 114a . . . to enter magazine 104 to contact bottom-most cassette 110a, an entry aperture 105 is provided in the wall opposite that in which exit 108 is formed.

Conveyor belt 116 preferably is a chain deployed about suitable roller members, such as sprocket wheels 118a, 118b, and is driven by a belt motor 120 (FIG. 2). Sprocket wheel 118b is supported by member 119 and tension spring 119a to an end wall 103a of the apparatus. Flights 114a, 114b, . . . , are seen to be wedge-shaped, or triangular, and are mechanically secured to and spaced along the length of belt 116. Each flight 114a, . . . , is adapted to contact bottom-most cassette 110a in input stack 102, to remove that cassette from the stack (as shown in FIG. 2) and to push that cassette to record/playback station 124. The wedge-shape of the flights, formed of leading and trailing sloping portions, is preferred so that when the leading sloping portion of a flight, such as flight 114' shown in broken lines in FIG. 2, pushes the bottom-most cassette 110a through exit 108, the remaining cassettes 110b, 110c, . . . in input stack 102 are raised gently and gradually over the leading portion without impeding the removal of cassette 110a and, furthermore, without jostling the remaining cassettes. The trailing portion of the flight gradually lowers the remaining cassettes 110b, 110c, . . . , as the flight passes through exit 108 in magazine 104. Another advantage of this wedge-shape of flights 114a, . . . , is that it minimized the likelihood of ensnaring, or catching, the front or nose of the flight in a cassette drive-spindle aperture which would deleteriously affect the smooth conveyance of the cassette.

A guide platform 122 extends substantially between input stack 102 and output store 152 for the purpose of suitably supporting and guiding a cassette, such as cassette 112, that is conveyed from input stack 102 to record/playback station 124 and then to output store 152. A cassette registration member 122a is provided along a longitudinal edge of the platform for a purpose soon to become apparent. As shown in FIGS. 1 and 2, bottom-most cassette 110a in magazine 104 rests upon a support that is coplanar with the surface of guide platform 122. If desired, platform 122 may extend within magazine 104 and form the floor for stack 102.

Record/playback deck 126 is provided at station 124 intermediate input stack 102 and output store 152, as shown. The deck includes a suitable chassis upon which are mounted a record/playback head 128 and an erase head 130 which are conventional in record/playback apparatus and which are adapted to be inserted through appropriate apertures 111b and 111c in the side wall of cassette 112 so as to engage the tape therein when the cassette has been conveyed to station 124. Deck 126 also includes a supply reel drive spindle 132, a take-up reel drive spindle 134, a capstan 136 and a pinch roller 133, as is conventional. Preferably, deck 126 is of the type whose construction is disclosed in greater detail in copending applications Ser. Nos. 678,596 and 678,704, both filed Apr. 20, 1976 and both assigned to the assignee of the present invention.

In the illustrated embodiment, deck 126 is coupled to a deck drive motor 142 (best shown in FIG. 4) by linkage 144, motor 142 being adapted to pivot the deck about a suitable pivot axis 146 secured to suitable supports (not shown). As is seen, pivot axis 146 is substantially parallel to the side wall of cassette 112 that is provided with apertures 111a, 111b and 111c. Thus, depending upon the operation of motor 142, deck 126 is adapted to pivot between its first (up), or cassette unload position shown in solid lines in FIG. 1, and its second (down), or operative, position shown in broken lines in FIG. 1 and shown more clearly in FIG. 2. As is appreciated, when deck 126 is driven towards its down position, drive-spindles 132 and 134 are inserted into corresponding drive-spindle apertures 113a and 113b in the top wall of cassette 112. Also, capstan 136 is inserted into a corresponding capstan-receiving aperture (not shown) so as to cooperate with pinch roller 138 when the latter enters apertures 111a in the side wall of cassette 112 to drive the tape housed within the cassette.

Figure 4:
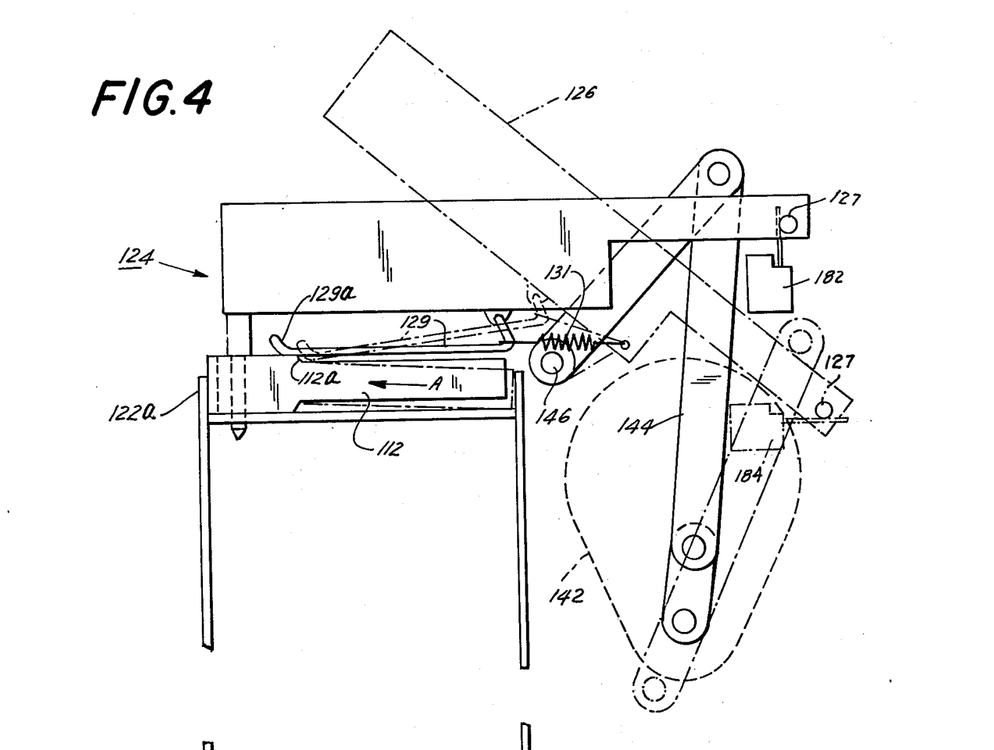
FIG. 4 is a schematic representation taken along lines 4—4 in FIG. 2 showing the operation of a portion of the record and/or playback apparatus.

During normal operation, cassette 112 is conveyed by flight 114a to record/playback station 124. In order to provide a fine alignment of cassette 112 with the drive spindles, capstan, pinch roller and heads of deck 126, the deck is provided with a positioning member 125 depending from the deck chassis and having an elbow 125a, as illustrated in FIG. 2, to shift cassette 112 slightly to the right when the deck pivots downward so that the respective apertures in the cassette are in final alignment with the aforementioned elements of deck 126. Also, as shown in FIG. 4, a guide member 129 is suspended from deck 126 and is spring-loaded to the deck by a spring 131. An elbow 129a provided on the free end of member 129 contacts cassette 112 at its boss 112a when deck 126 is pivoted downward and is adapted to "push" the cassette in the direction indicated by arrow A against registration member 122a so as to contribute to the final alignment of the cassette with respect to the tape processing elements of the deck. As deck 126 continues its downward movement, elbow 129a then slides over boss 112a.

Deck 126 also is provided with a chopper wheel 140 that is suitably coupled to supply reel drive spindle 132 so as to rotate when the supply reel drive spindle is driven. This chopper wheel is described in greater detail in the aforementioned copending applications and cooperates with suitable photosensing devices to derive sensor pulses indicative of the movement of tape either in a record or in a playback mode. These sensor pulses may be used in the manner described in copending applications Ser. Nos. 722,141 and 722,162, both filed Sept. 10, 1976.

Output store 152 is adapted to store processed cassettes 160, 160a, 160b, . . . in the so-called first-in, first-out configuration. That is, the cassette that had been used first appears on the top of output store 152, for example, cassette 160d (FIG. 2), and the cassette that had been used last appears on the bottom of this stack, such as cassette 160a. The output store comprises a magazine 154 formed of a plurality of walls, for example, three walls, to support the stack of cassettes 160a, 160b, . . . , therein. As will be described below, this stack is supported above the plane of support platform 122 and, accordingly, an elevator assembly is provided to receive a processed cassette, such as cassette 160, conveyed from record/playback station 124 by, for example, flight 114a and to add this cassette into the stack in magazine 154. In the illustrated embodiment, the elevator assembly comprises an elevator platform 162 pivotally coupled at 164 to a suitable support, or frame, of the apparatus. An elevator motor 166 is mechanically linked through linkage 168 and pin 170 to elevator platform 162, and is adapted to raise and lower the elevator platform so as to correspondingly add a processed cassette, such as cassette 160, to the bottom of the stack in magazine 154. Pivot connection 164 is disposed in a plane above the plane of guide platform 122 so that, in its cassette-receiving position, shown in FIG. 1 and in solid lines in FIG. 2, elevator platform 162 is inclined downwardly to receive cassette 160 driven onto its cassete-receiving portion by the flight as illustrated. Lip members 174 are provided on the cassette-receiving portion of platform 162 and are disposed below the plane of guide platform 122 when the elevator platform is in its illustrated inclined position. These lip members prevent cassette 160 from sliding off elevator platform 162. After cassette 160 is loaded onto platform 162, elevator motor 166 is operated to pivot the elevator platform upwardly and thus add cassette 160 as the bottom-most cassette in magazine 154.

As best seen in FIGS. 2 and 3, a spring-biased bracket member is pivotably coupled to the frame or chassis of the apparatus. The bracket member has projections 172 extending into magazine 154 so as to support the stack of cassettes 160a, 160b, . . . , in output store 152. As shown, projections 172 have cammed surfaces so as to permit the bracket member to pivot away from its normal support position and out of interference with cassette 160 that is raised by elevator platform 162. Once cassette 160 clears the projections, the spring biasing returns the bracket member to its normal support position.

When the illustrated apparatus is used in the environment of a central dictation system, an operator, such as a dictator at a remote dictate station, may designate the cassette upon which information is recorded as a special or "priority" cassette. Output store 152 thus is provided with a "priority" cassette eject feature whereby the "priority" cassette is discharged immediately rather than being placed as the bottom-most cassette in the stack of magazine 154. Since elevator platform 162 is pivoted at 164 in a plane above the plane of guide platform 122, it is appreciated that if the elevator platform is raised, a conveyed cassette merely will pass beneath it. Accordingly, the "priority" cassette eject feature includes a discharge ramp 176 (FIGS. 1 and 5) disposed beneath elevator platform 162 and angled downwardly to enable a "priority-ejected" cassette to slide into a storage bin 178 adjacent the ramp. To this effect, when a cassette is designated as a "priority" cassette, elevator platform 162 is driven by elevator motor 166 to its raised position, and then, subsequently, the "priority" cassette is conveyed by belt 116 towards output store 152. Since elevator platform 162 is not in a cassette-receiving position, the "priority" cassette, such as cassette 175a in FIG. 5, passes beneath the raised elevator platform and slides down ramp 176 into storage bin 178, shown as cassette 175. Elevator platform 162 then may return to its normal inclined cassette-receiving position for normal operation.

In order to monitor the progress of a change operation, and to determine when various interdependent functions should be performed in that operation, suitable limit switches are provided to sense the condition of deck 126, the condition of elevator platform 162, and the position of, for example, conveyed cassette 112 and flight 114b. More particularly, a limit switch 180 is disposed at record/playback station 124 and is adapted to be closed so as to produce a cassette-in-position signal when cassette 112 is conveyed by belt 116 into general alignment with deck 126 at the record/playback station. A pair of limit switches 182 and 184, shown in FIG. 4, are disposed at record/playback station 124 and cooperate with a pin, or actuator, 127 secured to deck 126. As shown, when deck 126 is pivoted to its down, or operative, position, actuator 127 closes limit switch 182 to produce a deck-down signal. Similarly, limit switch 184 is closed by actuator 127 to produce a deck-up signal.

Limit switches 186 and 188, shown in FIG. 2, are analogous to limit switches 182 and 184, respectively, and are adapted to be closed selectively by linkage 168 depending upon the position of elevator platform 162. More particularly, when elevator platform 162 is in its down, or cassette-receiving, position, linkage 168 closes limit switch 186 to produce an elevator-down signal. Conversely, when elevator 162 is raised, such as when the linkage is in the position shown at 168', limit switch 188 is closed to produce an elevator-up signal.

Yet another limit switch is provided and is adapted to be closed by a flight, such as flight 114b, that has been driven to a predetermined position with respect to magazine 104. The relative position of limit switches 180 and 190 is such that limit switch 190 will be closed by flight 114b at approximately the same time that limit switch 180 is closed by cassette 112. The closing of limit switch 190 produces a belt-in-position signal, this signal being produced approximately concurrently with the cassette-in-position signal produced by limit switch 180.

The signals produced by the aforedescribed limit switches are supplied to a control system (not shown) whereat the signals are used to selectively control the operation of motors 120, 142 and 166 to perform a cassette changing operation. This control system is disclosed in detail in copending application Ser. No. 722,162.

The operation of the illustrated apparatus now will be described. The initial position of belt 116 may be as illustrated by the solid lines of flight 114a, 114b, . . . , in FIG. 2, and it may be assumed that deck 126 is processing a cassette 112, and elevator platform 162 is in its inclined cassette-receiving position for receiving cassette 112 after this cassette has been processed. As mentioned above, for the purpose of this description, the expression "processing a cassette" means recording information on a cassette, as in a central dicatation system, or reproducing information from a cassette, as in a dictation system, a transcribing system or a home entertainment system. After cassette 112 has been processed, deck drive motor 142 pivots deck 126 from its down position (FIG. 2) to its up position (FIG. 1) so that cassette 112 can be conveyed to output magazine 154. Once deck 126 reaches its up position, belt motor 120 is energized so that flight 114a conveys cassette 112 onto elevator platform 162 and effectively wedges it between the platform and bottom-most cassette 160a in the output magazine. As mentioned previously, lip members 174 on elevator platform 162 prevent the received cassette, such as cassette 160, from sliding off the platform. Concurrently with this conveying operation, flight 114b passes through apertures 105 in magazine 104 to contact the bottom-most cassette 110a in the magazine and to convey this cassette through exit 108 and along guide platform 122 toward record/playback station 124. It is appreciated that the cassettes are conveyed in a direction parallel to the side wall that is provided with apertures, such as apertures 111a, 111b and 111c. When this fresh cassette is positioned properly at record/playback station 124, deck motor 142 pivots deck 126 downwardly into operative relation with the cassette (FIG. 4) and, concurrently, elevator motor 166 pivots elevator platform 162 upwardly to add the last-processed cassette, such as the cassette shown at 160 in FIG. 2, into magazine 154 as the bottom-most cassette. As described in copending application Ser. No. 722,162 the electronic control system de-energizes belt motor 120 when limit switch 180 is closed by cassette 112 that has been conveyed to record/playback station 124. At this time, the nose of flight 114a is in contact with cassette 112. As deck 126 pivots downwardly, elbow 125c on positioning member 125 pushes cassette 112 to the right for proper adjustment of apertures 111a, 111b and 111c, and apertures 113a and 113b with pinch roller 138, record/playback head 128 and erase head 130, and drive spindles 132 and 134, respectively. Also, as shown in FIG. 4, guide member 129 on deck 126 contacts the top wall of cassette 112, and particularly boss 112a, to push the cassette in the direction A against registration member 122a for final registration and alignment of the cassette with respective record/reproduce and tape drive elements on deck 126.

When elevator platform 162 is pivoted upwardly, cassette 160 acts as a lever to urge the stack of cassettes 160a, 160b, . . . , upward. This raises the stack above projections 172 and permits them to pivot out of interference when contacted by cassette 160. Cassette 160 thus is added as the bottom-most cassette in this stack. After cassette 160 clears the projections, they return to their illustrated support position for the stack. Elevator platform 162 then is driven by motor 166 to its inclined cassette-receiving position.

Deck 126 then may be controlled to record information on the magnetic tape housed within the cassette loaded thereon, such as the cassette designated 112, or may perform a playback operation to reproduce information that had been recorded on tape. After the record or playback operation is completed, a cassette changing cycle is initiated whereby deck motor 142 pivots deck 126 to its up position, belt motor 120 drives belt 116 to convey the processed cassette onto elevator platform 162 and to convey a fresh cassette from the bottom of input stack in magazine 104 to record/playback station 124, and then elevator motor 166 pivots elevator platform 162 to its up position while deck motor 142 now drives deck 126 to its down position, as just described. Once elevator motor 166 returns elevator 162 to its down position, the illustrated apparatus is prepared for reuse and for a subsequent cassette changing cycle. In the event that input magazine ultimately is depleted of cassettes, the apparatus automatically assumes a standby state awaiting further operation once the supply of cassettes is replenished, as described in copending application Ser. No. 722,162.

Figure 5:
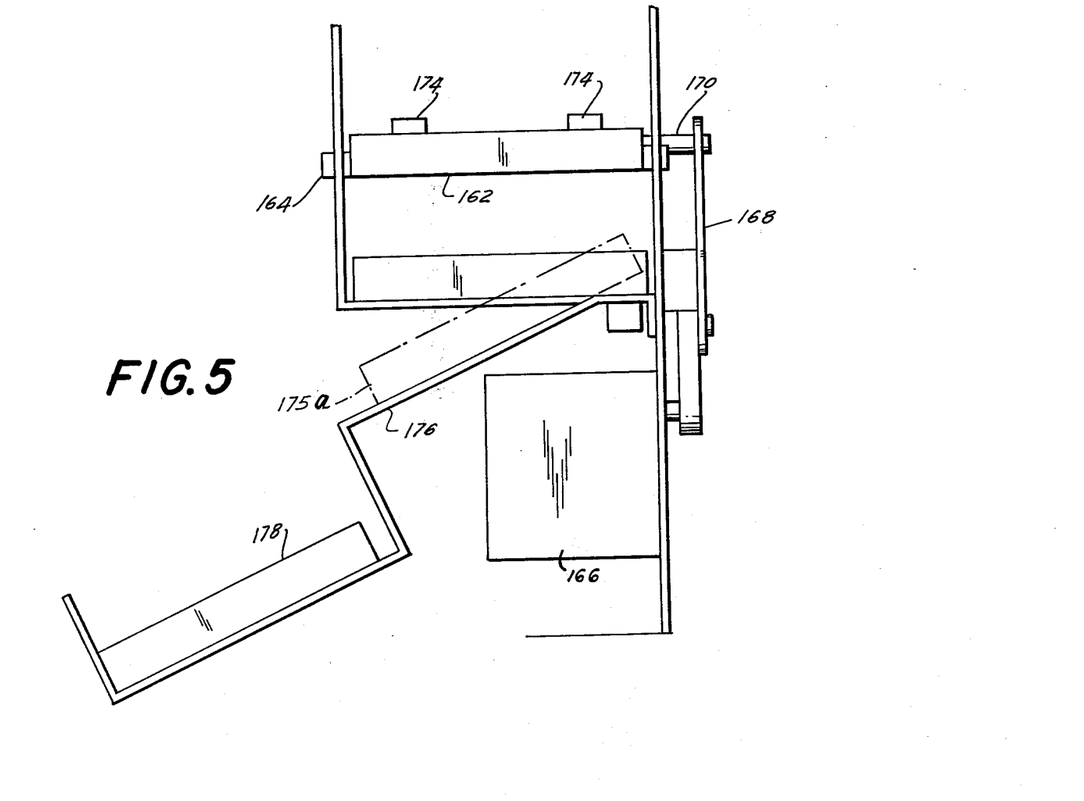
FIG. 5 is a view taken along lines 5—5 in FIG. 2, showing one of the novel features in this apparatus.

If a particular cassette that is being or is in position to be processed is designated by the operator as a "priority" cassette, for example, to be immediately ejected for transcription as soon as possible, this cassette is not loaded into output magazine 154. Rather, prior to unloading this "priority" cassette from deck 126, motor 166 is energized to pivot elevator platform 162 upwardly, as described in copending application Ser. No. 722,162. Since the platform is "empty, " it has no effect upon the stack of cassettes in output magazine 154. Then, when a change operation is performed to unload the "priority" cassette from the deck, this cassette is conveyed beneath the elevator platform, as shown in FIG. 5. Because elevator platform 162 has been pivoted out of cooperation with this "priority" cassette, the cassette falls onto ramp 176, as at 175a, and slides down the ramp to be intercepted by and stored in bin 178 for immediate retrieval and transcription. Elevator platform 162 then is pivoted to its inclined cassette-receiving position to receive the next cassette that is being processed at record/playback station 124. Of course, if this next cassette is a "priority" cassette, the aforedescribed priority eject mode of operation is repeated.

While the foregoing has particularly shown and described the present invention with respect to a preferred embodiment thereof, it should be readily apparent that various changes and modifications in form and details may be made without departing from the spirit and scope of this invention. It is therefore intended that the appended claims be interpreted as including such changes and modifications.

What is claimed is:

1. Cassette changer apparatus for use in a multiple cassette record and/or playback device, comprising:
   an input magazine for storing a stack of cassettes disposed therein one atop the other, each cassette including a housing for magnetic tape and respective apertures through which said tape is accessed for a recording or playback operation;
   an output magazine spaced from said input magazine for storing a stack of cassettes disposed therein one atop the other;
   a record/playback station disposed intermediate said input and output magazines;
   endless conveyor means for conveying a cassette from said input magazine to said record/playback station and then from said record/playback station to said output magazine;
   loading means at said output magazine for receiving said cassette conveyed thereto and for loading same into said stack therein;
   a record/playback deck at said record/playback station movable between a first position spaced from a cassette conveyed to said record/playback station and a second position in operative relation with respect to said cassette, said record/playback deck including tape drive means for bi-directionally driving said tape housed within said cassette and a magnetic transducer for recording information on and/or reproducing information from said tape; and
   deck drive means for moving said record/playback deck between said first and second positions.

2. Cassette changer apparatus in accordance with claim 1 wherein said loading means comprises elevator means having a platform positioned beneath the stack in said output magazine for receiving said cassette conveyed thereto and for raising same to said stack thereby to be added as the bottom-most cassette therein.

3. Cassette changer apparatus in accordance with claim 2 wherein said output magazine includes a plurality of walls and further comprising support means secured to at least one of said walls for supporting said stack of cassettes in said output magazine, said support means assuming a normal support position and being urged away from said support position by the cassette raised by said elevator means and then returning to said support position after said cassette has been added to said stack in said output magazine.

4. Cassette changer apparatus in accordance with claim 3 wherein said support means comprises a plurality of pivotable, spring-loaded claws.

5. Cassette changer apparatus in accordance with claim 2 wherein said cassettes are conveyed from said input magazine to said record/playback station and thence to said output magazine in a common plane; and wherein said platform of said elevator means is pivotally coupled to said output magazine at a pivot axis above said plane, said platform having a cassette receiving portion spaced from said pivot axis so that said platform is inclined downwardly from said pivot axis to slidably receive a cassette conveyed thereto.

6. Cassette changer apparatus in accordance with claim 5 wherein the receiving portion of said platform includes lip means for preventing a cassette conveyed onto said platform from sliding off said platform when the latter is in an inclined position.

7. Cassette changer apparatus in accordance with claim 5 wherein said elevator means includes elevator drive means for pivoting said platform about said pivot axis between said inclined position and a raised position, the latter position being effective to add the cassette on said platform to said stack in said output magazine.

8. Cassette changer apparatus in accordance with claim 1 wherein said endless conveyor means comprises an endless, unidirectionally-driven conveyor member; a pair of roller members disposed in the vicinity of said input and output magazines, respectively, about which said conveyor member is deployed for supporting and driving said conveyor member; and at least one cassette contacting member secured to said conveyor member for withdrawing a cassette from said input magazine and pushing same to said record/playback station when said conveyor member is driven, and thence to said output magazine.

9. Cassette changer apparatus in accordance with claim 8 wherein said conveyor member comprises an endless chain; and said roller members comprise sprocket wheels, one of said sprocket wheels being positioned adjacent a cassette entry portion of said output magazine and the other of said sprocket wheels being positioned upstream of a cassette exit portion of said input magazine.

10. Cassette changer apparatus in accordance with claim 8 wherein said cassette contacting member is substantially triangular-shaped having a leading sloping portion and a trailing sloping portion, said leading sloping portion removing the bottom-most cassette in the stack in said input magazine while gradually urging upward the remaining cassettes in said input magazine, and said trailing sloping portion gradually lowering said remaining cassettes in said input magazine.

11. Cassette changer apparatus in accordance with claim 8 wherein said conveyor means further comprises a planar support extending between said input and output magazines for supporting and guiding cassettes conveyed therebetween.

12. Cassette changer apparatus in accordance with claim 1 wherein said record/playback deck is pivotally mounted at said record/playback station to pivot from said first position down to said second position thereby to record information on and/or reproduce information from the tape housed within the cassette conveyed to said record/playback station, and thence to pivot from said second position up to said first position thereby to enable said cassette to be conveyed from said record/playback station to said output magazine.

13. Cassette changer apparatus in accordance with claim 12 wherein said cassette housing includes a top wall having apertures to receive said tape drive means of said record/playback deck and a side wall having apertures to receive said magnetic transducer of said record/playback deck; and wherein said record/playback deck is pivoted about a pivot axis substantially parallel to said cassette housing side wall when said cassette is positioned at said record/playback station, said tape drive means comprising drive spindles depending from said deck and said magnetic transducer comprising a record and/or playback head depending from said deck.

14. Cassette changer apparatus in accordance with claim 13 wherein said record/playback deck further includes a positioning member depending therefrom and having an elbow for contacting a cassette conveyed to said record/playback station to position said cassette in alignment with said drive spindles and said record and/or playback head while said deck pivots to said second position.

15. Cassette changer apparatus in accordance with claim 1 further comprising a support table having a planar surface extending between said input and output magazines; and wherein said input magazine includes a plurality of walls for defining said stack of cassettes, the bottom-most cassette in said stack lying on a plane coplanar with said table surface; one of said input magazine walls having an exit portion through which said bottom-most cassette is conveyed.

16. Cassette changer apparatus in accordance with claim 15 wherein said conveyor means comprises an endless conveyor member having at least one cassette contacting member secured thereto; and wherein another of said input magazine walls opposite said one wall has an aperture through which said cassette contacting member passes to contact said bottom-most cassette in said stack and push said bottom-most cassette through said exit portion in said one wall.

17. In a multiple cassette record/playback system, cassette changer apparatus, comprising:
an input magazine having a plurality of walls for storing a stack of cassettes arranged one atop the other, each cassette including a housing for magnetic tape therein and having top and bottom walls provided with apertures to receive tape drive spindles and a side wall provided with apertures to receive a magnetic transducer;
an output magazine having a plurality of walls for storing a stack of cassettes arranged one atop the other;
an endless conveyor member for conveying the bottom-most cassette in said input magazine toward said output magazine, said conveyor member including at least one cassette contacting member for pushing said bottom-most cassette out of said input magazine and along a path parallel to said cassette side wall that is provided with said apertures;
a support platform extending between said input and output magazines for supporting cassettes conveyed by said conveyor member;
a record/playback deck disposed intermediate said input and output magazines and pivotally mounted to pivot between first and second positions, said first position permitting a cassette to be conveyed thereto from said input magazine and also to be conveyed therefrom to said output magazine, and said second position being an operating position to record information on and/or reproduce information from tape in a cassette; said record/playback deck having drive spindles and a magnetic transducer depending therefrom;
an elevator platform pivotally coupled to said output magazine at a pivot axis that is above the plane of said support platform to pivot between an inclined position for receiving a cassette conveyed thereto from said record/playback deck by said conveyor member and a loaded position whereat said received cassette is added as the bottom-most cassette to the stack in said output magazine; and
drive means for driving said conveyor member to convey the bottom-most cassette from said input magazine to said record/playback deck and thence, after information is recorded on or reproduced from the tape in said cassette, to convey said cassette to said elevator platform.

18. Cassette changer apparatus in accordance with claim 17 wherein said conveyor member includes a plurality of cassette contacting members spaced therealong to convey a cassette from said input magazine to said record/playback deck concurrently with the conveying of a cassette from said record/playback deck to said elevator platform.

19. Cassette changer apparatus in accordance with claim 18 further comprising a ramp beneath said elevator platform; a bin adjacent said ramp; and elevator drive means for selectively pivoting said elevator platform to its loaded position prior to the time that a cassette is conveyed thereto so that when a cassette is so conveyed, said cassette is driven onto said ramp and slides into said bin.

20. Cassette changer apparatus in accordance with claim 17 wherein said support platform is provided with a registration member along a longitudinal edge thereof; and wherein said record/playback deck is provided with a guide member suspended therefrom to contact a cassette conveyed thereto from said input magazine so as to urge said cassette against said registration member into predetermined alignment as said record/playback deck pivots to said second position.

* * * * *